US009957049B2

(12) United States Patent
Apdalhaliem et al.

(10) Patent No.: US 9,957,049 B2
(45) Date of Patent: May 1, 2018

(54) RETRACTABLE SHADE AND METHOD FOR ASSEMBLING THE SAME

(71) Applicant: The Boeing Company, Chicago, IL (US)

(72) Inventors: Sahrudine Apdalhaliem, Seattle, WA (US); Kimberly Dawn Meredith, Newcastle, WA (US); Morteza Safai, Newcastle, WA (US); Lon E. Switzer, Marysville, WA (US); Thomas Seth Perkins, Renton, WA (US); Scott A. Langdon, Mukilteo, WA (US); Tuan D. Nguyen, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 14/012,383

(22) Filed: Aug. 28, 2013

(65) Prior Publication Data

US 2015/0059988 A1 Mar. 5, 2015

(51) Int. Cl.

*B64D 15/00* (2006.01)
*B64D 11/00* (2006.01)
*B64C 1/14* (2006.01)
*E06B 7/00* (2006.01)
*E06B 7/28* (2006.01)
*B64C 1/32* (2006.01)

(52) U.S. Cl.

CPC ................ *B64D 11/00* (2013.01); *B64C 1/14* (2013.01); *B64C 1/1423* (2013.01); *B64C 1/1484* (2013.01); *B64C 1/32* (2013.01); *E06B 7/00* (2013.01); *E06B 7/28* (2013.01); *Y10T 29/49826* (2015.01)

(58) Field of Classification Search

CPC .... B60J 1/08; E06B 9/17007; E06B 9/17015; E06B 9/17023; E06B 2009/17069
USPC ............. 160/127, 370.22; 244/134 A, 134 D
See application file for complete search history.

(56) References Cited

U.S. PATENT DOCUMENTS 2,660,659 A * 11/1953 Sarno ........................... 219/201
3,217,137 A * 11/1965 Weitzner ....................... 219/201
3,982,092 A * 9/1976 Marriott ........................ 219/203
(Continued)

FOREIGN PATENT DOCUMENTS

DE 2704248 A1 8/1978
DE 102008047508 B4 * 12/2012
(Continued)

OTHER PUBLICATIONS

EPO Search Report for related application 14182471.4 dated Feb. 10, 2015, 7 pp.

*Primary Examiner* — Katherine W Mitchell
*Assistant Examiner* — Johnnie A. Shablack
(74) *Attorney, Agent, or Firm* — Gates & Cooper LLP

(57) ABSTRACT

A heated roller shade system is provided. The heated roller shade system includes a roller located in a cavity defined between an inner wall of a vehicle and an outer wall of the vehicle. The roller shade system also includes a shade coupled to the roller. The roller is configured to selectively move the shade between a deployed position and an open position. The roller shade system also includes a heating mechanism coupled to at least one of the roller and the shade. The heating mechanism facilitates increasing a temperature of at least one of the roller and the shade.

19 Claims, 8 Drawing Sheets

(56) References Cited

U.S. PATENT DOCUMENTS

| | | | | |
|---|---|---|---|---|
| 4,131,269 | A * | 12/1978 | Brattrud | 296/95.1 |
| 4,275,645 | A * | 6/1981 | Ruff | A47F 3/0469 160/120 |
| 4,399,347 | A | 8/1983 | Schmitt | |
| 4,942,287 | A * | 7/1990 | Walker | 219/385 |
| 5,089,912 | A * | 2/1992 | Simin | 359/608 |
| 5,544,690 | A * | 8/1996 | Magro et al. | 160/133 |
| 5,653,277 | A * | 8/1997 | Kerner | B60J 1/2044 160/264 |
| 6,713,733 | B2 | 3/2004 | Kochman et al. | |
| 6,768,086 | B2 * | 7/2004 | Sullivan et al. | 219/494 |
| 7,401,840 | B2 * | 7/2008 | Schnoblen et al. | 296/143 |
| 7,718,923 | B1 | 5/2010 | Hansen et al. | |
| 8,646,828 | B2 * | 2/2014 | Haase | B60J 1/2041 296/146.1 |
| 8,663,535 | B2 * | 3/2014 | Larcom | B60R 13/0243 264/319 |
| 2006/0214465 | A1 * | 9/2006 | Chau | B60J 11/00 296/136.1 |
| 2011/0006050 | A1 | 1/2011 | Nee et al. | |
| 2012/0152929 | A1 * | 6/2012 | Hintennach | 219/202 |

FOREIGN PATENT DOCUMENTS

| | | |
|---|---|---|
| EP | 1600316 A1 | 11/2005 |
| GB | 1432862 | 4/1976 |
| JP | 07223432 | 8/1995 |

* cited by examiner

RETRACTABLE SHADE AND METHOD FOR ASSEMBLING THE SAME

BACKGROUND

The field of the disclosure relates generally to systems and methods to improve the safety and durability of an aircraft, and more particularly to heated roller shade systems that facilitate reducing the likelihood of failure and/or durability damage of a roller shade in an over-wing exit of an aircraft.

In at least some known aircrafts, a roller shade is included in an emergency exit over the wing rather than a conventional shade system due to space restrictions. Known roller shade systems generally include a roller coupled to an extendable shade that selectively extends and retracts in order to selectively control light and/or heat entering a cabin of the aircraft as needed by the passengers. In particular, when in the open position, the roller shade system provides visibility of the environment external to the aircraft, and when in the deployed position, the roller shade system facilitates reducing visibility outside of the aircraft.

Currently, during operation, the temperature outside the aircraft may vary dramatically in a range of about −70°-140° Fahrenheit. Specifically, the temperature outside the aircraft when on the ground may be upwards of 140° Fahrenheit, while the temperature outside the aircraft during flight may be below −70° Fahrenheit. The freezing temperatures outside of the aircraft during flight may pass through the outer hull towards the cabin of the aircraft cooling the area between the hull and the cabin through conduction. As such, in known aircrafts, the cabin is heated to maintain passenger comfort and a heating strip is used around the exit doors to prevent cool drafts into the cabin. However, the area defined between the cabin and the hull is typically not heated. Therefore, the temperature inside the defined area may drop below freezing as the external temperature drops.

Known roller shade systems are typically located in this defined area, and freezing temperatures inside the defined area may lead to a buildup of ice as moisture in and around the roller shade system freezes. Ice buildup in and around the roller shade system may cause known roller shade systems to be damaged and/or fail to operate properly. Specifically, known shade components may be susceptible to crumpling, edge tearing, cracking, wrinkling or any combination thereof as moisture from humidity freezes inside the shade. Depending on the damage, the shade may not extend into the deployed position. Additionally, the shade may not retract completely when moving to the open position. The roller component is also susceptible to sticking, cracking, and/or other damage due to ice buildup.

BRIEF DESCRIPTION

In one aspect, a heated roller shade system is provided. The heated roller shade system includes a roller located in a cavity defined between an inner wall of a vehicle and an outer wall of the vehicle. The roller shade system also includes a shade coupled to the roller. The roller is configured to selectively move the shade between a deployed position and an open position. The roller shade system also includes a heating mechanism coupled to at least one of the roller and the shade. The heating mechanism facilitates increasing a temperature of at least one of the roller and the shade.

In another aspect, a method for assembling a roller shade system is provided. The method includes positioning a roller and a shade in a cavity defined by an inner wall of a vehicle and an outer wall of the vehicle. The method also includes coupling the shade to the roller. The roller is configured to selectively move the shade between a deployed position and an open position. The method also includes coupling a heating mechanism to at least one of the roller and the shade. The heating mechanism facilitates increasing a temperature of at least one of the roller and the shade.

In yet another aspect, a door system for use in a vehicle is provided. The door system includes a door coupled to the vehicle and a roller located in a cavity defined between an inner wall of said door and an outer wall of said door. The door system also includes a shade coupled to the roller. The roller is configured to selectively move the shade between a deployed position and an open position. The door system also includes a heating mechanism coupled to at least one of the roller and the shade. The heating mechanism facilitates increasing a temperature of at least one of said roller and said shade.

The features, functions, and advantages described herein may be achieved independently in various implementations of the present disclosure or may be combined in yet other implementations, further details of which may be seen with reference to the following description and drawings.

DETAILED DESCRIPTION

Figure 1:
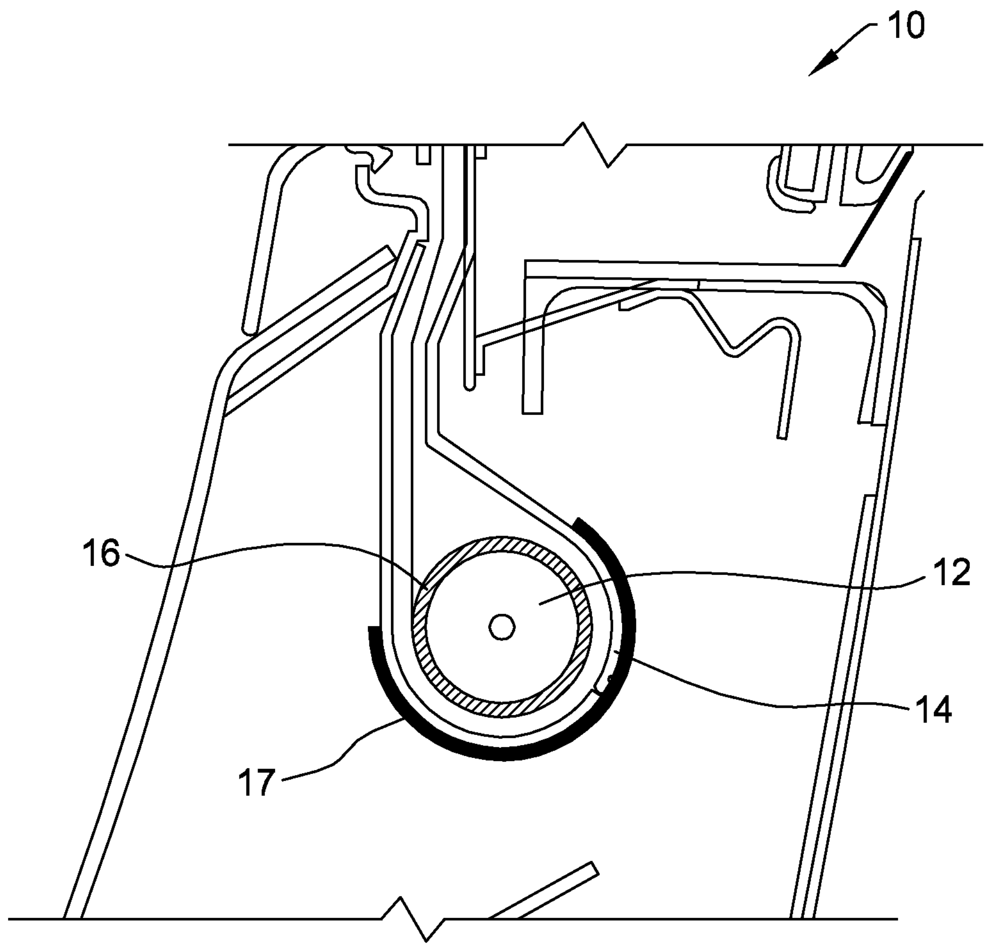
FIG. 1 is an axial cross-sectional view of an exemplary heated roller shade system that may be used with an over-wing exit system.

The implementations described herein provide a roller shade system that may be used with a vehicle. In one implementation, the roller shade system is used in an over-wing exit door or other exit door in an aircraft. The heated roller shade system includes a roller coupled to an extendable shade. In operation, the roller selectively moves the shade between a deployed position and an open position. When the shade is in the deployed position, the shade facilitates reducing light and heat being transmitted from the external environment to the cabin of the vehicle. When the shade is in the open position, a visual opening is defined between the cabin of the vehicle and the environment surrounding the vehicle, and the visual opening enables an area external to the vehicle to be viewed. The roller and the shade may be encapsulated within a roller housing that insulates and/or shields the roller and shade.

The heated roller shade system includes a heating mechanism to facilitate increasing the temperature of the roller, the roller housing, and/or the shade. Specifically, the heated roller shade system includes a heating mechanism that facilitates increasing the temperature of the roller, the roller housing, and/or the shade from a first temperature to a second temperature, where the second temperature is higher than the first temperature. In some implementations, the roller shade system described herein facilitates preventing the buildup of ice in and around the heated roller shade system, and thus facilitates improving the dependability and durability of the roller and/or the shade. The heated roller shade system is described herein as being used with an over-wing exit of an aircraft; however, it should be understood that the heated roller shade system can be used in other locations, in other vehicles, and for other purposes.

One or more specific implementations of the present disclosure will be described below. In an effort to provide a concise description of these implementations, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various implementations of the present disclosure, the articles "a," "an," "the," and "said" are intended to mean that there are one or more of the elements. The terms "comprising," "including," and "having" are intended to be inclusive and mean that there may be additional elements other than the listed elements. As used herein the term "couple" can include direct physical coupling as well as electrical coupling, thermal coupling, communicative coupling, or any combination thereof.

FIG. 1 illustrates an exemplary heated roller shade system 10 that may be used in a vehicle (not shown). The vehicle may be any type of vehicle, including but not limited to, an automobile, truck, car, van, aircraft, boat, or spacecraft. In one implementation, heated roller shade system 10 may be used in an over-wing exit door (not shown in FIG. 1) of an aircraft. Heated roller shade system 10 includes a roller 12 that includes a pretension spring (not shown), a roller housing 14, a shade 16, and a heating mechanism 17. Roller 12 is positioned in a cavity defined between an inner wall and an outer wall of a vehicle, such as between an inner wall and an outer wall of a door of the vehicle as described below. Roller 12 selectively extends shade 16 between an open position (not shown in FIG. 1) and a deployed position (not shown in FIG. 1). When in the deployed position, heated roller shade system 10 facilitates reducing heat and/or light being transmitted between the external environment and the interior of the vehicle. When in the open position, heated roller shade system 10 defines a visual opening between an interior of the vehicle and the external environment (not shown in FIG. 1) through which passengers may view the external environment. In other implementations, heated roller shade system 10 does not include roller housing 14.

In the exemplary implementation, shade 16 is fabricated from a fiberglass fiber that is embedded into a polyvinyl chloride (PVC) casing. Further in the exemplary implementation, shade 16 is coated with a layer of aluminum-based pigment. In other implementations, shade 16 may be fabricated from any material that enables shade 16 to operate as described herein. In the exemplary implementation, roller housing 14 is positioned about roller 12, such as substantially circumscribing roller 12, to facilitate shielding roller 12 and shade 16 from damage. In some implementations, roller housing 14 also includes an insulating material positioned between roller housing 14 and roller 12. Alternatively, insulating material may be positioned anywhere that enables roller housing 14 to insulate and shield roller 12 and shade 16 as described herein.

In the exemplary implementation, heating mechanism 17 is thermally coupled to at least one of roller 12, roller housing 14, and shade 16 to selectively increase their respective temperatures. Moreover, in the exemplary implementation, heating mechanism 17 raises the temperature to a temperature that is above freezing to facilitate reducing ice buildup in and around heated roller shade system 10. In the exemplary implementation, heating mechanism 17 is at least one of a resistive heating mechanism (not shown in FIG. 1), an inductive heating mechanism (not shown in FIG. 1), a thermo-electric heating mechanism (not shown in FIG. 1), and/or an air gap heating mechanism (not shown in FIG. 1). Alternatively, heating mechanism 17 may be any heating device that enables heating mechanism 17 to operate as described herein.

Figure 2:
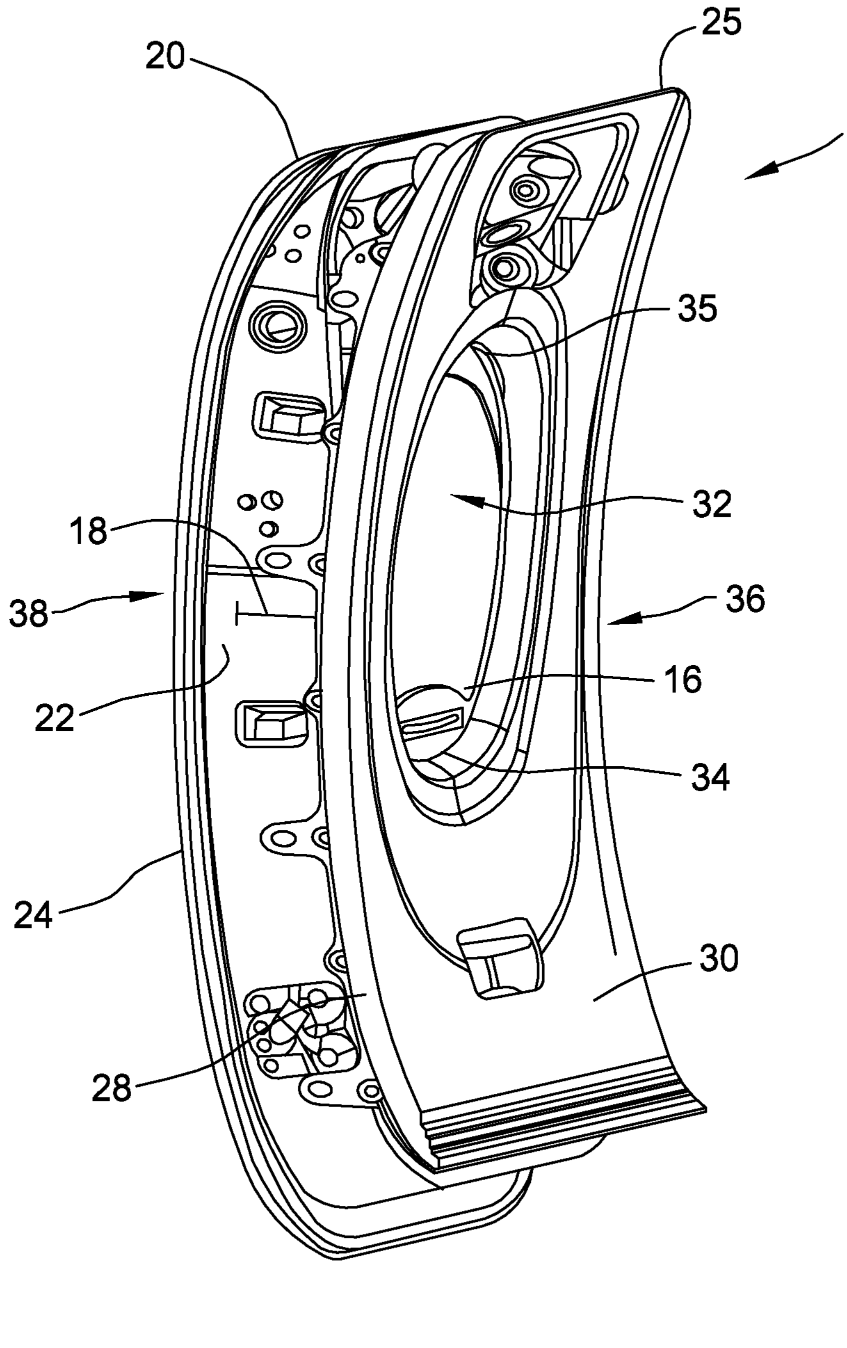
FIG. 2 is a perspective view of the over-wing exit system including the heated roller shade system shown in FIG. 1.

FIG. 2 illustrates an exemplary over-wing exit door 19 in which heated roller shade system 10 operates. In the exemplary implementation, over-wing exit door 19 includes a hull 20 and a cabin wall 25. Hull 20 can be considered an outer wall of door 19, and cabin wall 25 can be considered an inner wall of door 19 such that shade system 10 is positioned between the inner wall and the outer wall of door 19. Hull 20 includes an inner hull surface 22 and an outer hull surface 24, and cabin wall 25 includes an outer cabin wall 28 and an inner cabin wall 30. Heated roller shade system 10 is positioned within a cavity 18 defined between hull 20 and cabin wall 25, and more specifically between inner hull surface 22 and outer cabin wall 28. Heated roller shade system 10 facilitates selectively obscuring a window 32 by extending shade 16 from a fully open position 34 to a fully deployed position 35 or to any position between these two positions. In the exemplary implementation, a passenger (not shown) moves shade 16 toward fully deployed position 35 to obscure window 32 to facilitate reducing light and/or heat entering cabin 36 from external environment 38 as needed by the passenger. Also in the example implementation, shade 16 is selectively retracted toward fully open position 34 by a passenger to define a visual opening that allows light and/or heat to pass through window 32 from external environment 38. In at least some implementations, heated roller shade system 10 retracts shade 16 in response to an emergency to allow viewing of exit conditions prior to utilizing over-wing exit door 19. Alternatively, shade 16 may be retracted in response to any other event and/or situation as needed by the passenger.

Reduced temperatures, i.e., temperatures at or below freezing temperatures, from external environment 38 induce freezing temperatures on outer hull surface 24. From outer hull surface 24, the freezing temperature propagates through cavity 18 toward cabin 36 by means of thermal conduction and/or convection. Although, cabin 36 may be heated to maintain passenger comfort; cavity 18 is sealed from cabin 36 by cabin wall 25. Therefore, the temperature inside cavity 18 may be reduced to be at or below the freezing temperatures associated with external environment 38. Further, any moisture inside cavity 18, i.e. from humid climates, may permeate shade 16 and surround roller 12 and/or roller housing 14. As the temperature inside cavity 18 drops below a freezing temperature, ice crystals may form inside shade 16, around roller 12, and/or around roller housing 14, causing at least one of shade 16 and roller 12 to malfunction and/or become damaged. To facilitate increasing the temperature in and around roller 12 and shade 16, heating mechanism 17 (shown in FIG. 1) provides heat to at least one of roller 12, roller housing 14, and shade 16.

Figure 3:
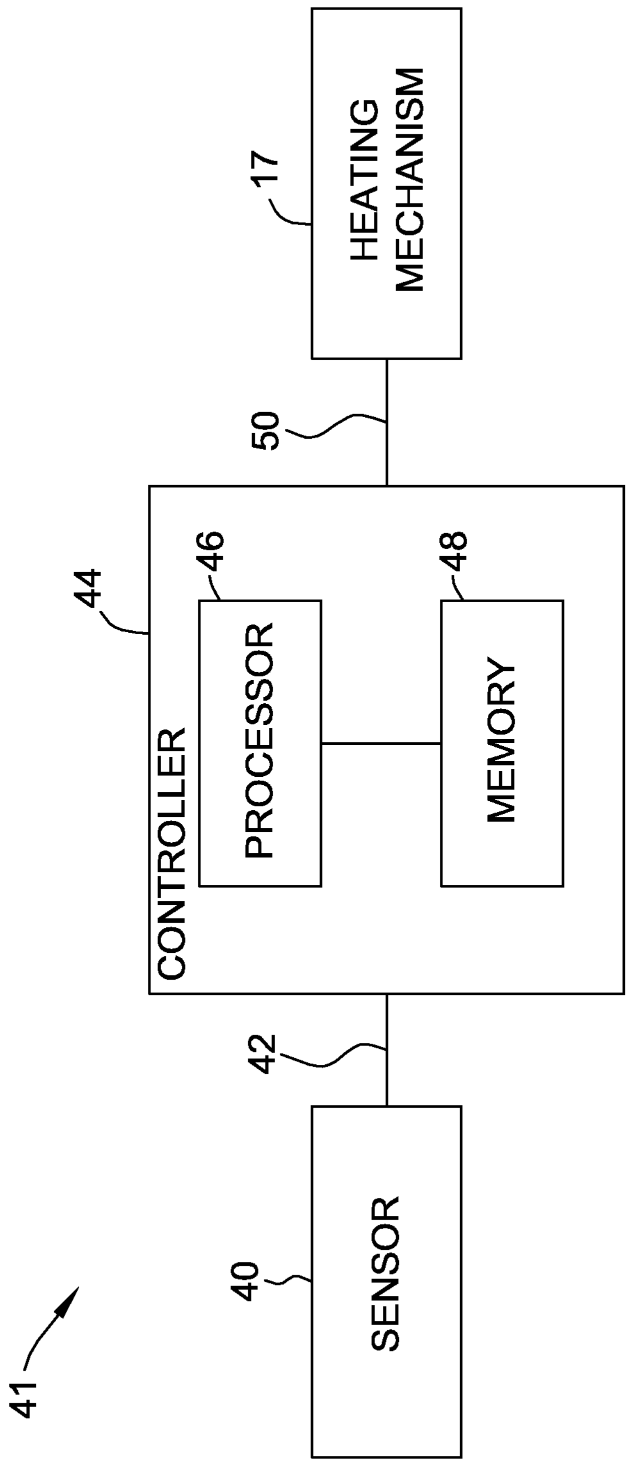
FIG. 3 is a block diagram of a heating control system that may be used with the heated roller shade system shown in FIG. 1.

FIG. 3 illustrates a block diagram of an exemplary heating control system 41 that may be used to control heating mechanism 17. Heating control system 41 includes heating mechanism 17, a sensor 40, a sensor wire 42, a controller 44, and a power line 50. In the exemplary implementation, heating control system 41 activates and deactivates heating mechanism 17 to facilitate selectively increasing the temperature of roller 12 (shown in FIG. 1), roller housing 14 (shown in FIG. 1), and/or shade 16 (shown in FIG. 1). Further in the exemplary implementation, heating control system 41 controls heating mechanism 17 based on data received from sensor 40.

In the exemplary implementation, sensor 40 measures at least one of a temperature, a humidity, and/or a time associated with heated roller shade system 10. For example, in one implementation, sensor 40 is one of a thermocouple, thermistor, and an infrared sensor and measures temperature associated with roller 12, roller housing 14, and/or shade 16. In the exemplary implementation, sensor 40 transmits a signal to controller 44 with the data measured by sensor 40 through sensor wire 42. Alternatively, sensor 40 may communicate wirelessly with controller 44 through any suitable wireless communication method, including, e.g., without limitation, radio frequency (RF). In the exemplary implementation, heating control system 41 may include any number of sensors 40 that enable heating control system 41 to operate as described herein.

In the exemplary implementation, controller 44 includes at least one processor 46 that is coupled to a memory device 48 for executing instructions. In some implementations, executable instructions are stored in memory device 48. In the exemplary implementation, controller 44 performs one or more operations described herein by executing the executable instructions stored in memory device 48. For example, processor 46 may be programmed by encoding an operation as one or more executable instructions in memory device 48 and by providing the executable instructions from memory device 48 to processor 46 for execution.

Processor 46 may include one or more processing units (e.g., in a multi-core configuration). Further, processor 46 may be implemented using one or more heterogeneous processor systems in which a main processor is present with secondary processors on a single chip. In another illustrative example, processor 46 may be a symmetric multi-processor system containing multiple processors of the same type. Further, processor 46 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, memory device 48 is one or more devices that enable information, such as executable instructions and/or other data, to be stored and retrieved. Memory device 48 may include one or more computer readable media, such as, without limitation, dynamic random access memory (DRAM), static random access memory (SRAM), a solid state disk, and/or a hard disk. Memory device 48 may be configured to store, without limitation, application source code, application object code, configuration data, predefined threshold settings, and/or any other type of data.

Controller 44 controls heating mechanism 17 based on the data received from sensor 40, and based on a current status of heating mechanism 17. More specifically, in the exemplary implementation, memory device 48 contains a current status of heating mechanism 17, an activation threshold, and a deactivation threshold. The current status of heating mechanism 17 is indicative of whether or not heating mechanism 17 is currently active and providing heat to roller 12, roller housing 14, and/or shade 16. The activation threshold defines a value of a parameter, e.g., without limitation, temperature, humidity, and/or time, at which heating mechanism 17 is activated. In one implementation, the activation threshold is a predefined temperature value, for example, a near-freezing temperature, where, when the temperature around heated roller shade system 10 drops below the predefined temperature value, heating mechanism 17 is activated. In other implementations, the activation threshold is a predefined humidity level, such as a humidity that enables ice crystals to form, at which point heating mechanism 17 is activated. In still other implementations, the activation threshold is a predefined point in time, e.g., without limitation, a time since take-off and/or a time since heating mechanism 17 was last activated or deactivated, at which point heating mechanism 17 is activated. Similarly, the deactivation threshold defines a value of a parameter, e.g., without limitation temperature, humidity, and/or time at which heating mechanism 17 is deactivated. In the exemplary implementation, deactivating heating mechanism 17 based on the deactivation threshold facilitates preventing overheating of heated roller shade system 10. In some implementations, the activation threshold and the deactivation threshold are based on a plurality of parameters. Furthermore, in some implementations, the activation threshold and the deactivation threshold may be based on the same parameter such that they generate a range of temperatures, humidity levels, and/or time periods during which heating mechanism 17 is active. In the exemplary implementation, the activation threshold and the deactivation threshold may be set manually by an aircraft operator.

Processor 46 receives data, e.g., without limitation, temperature data, humidity data, and time from sensor 40. Processor 46 also compares the data with one of the activation threshold and the deactivation threshold based on the current status of heating mechanism 17. For example, processor 46 compares the data with the activation threshold when heating mechanism 17 is deactivated, and compares the data with the deactivation threshold when heating mechanism 17 is activated. Processor 46 also activates and/or deactivates heating mechanism 17 based on the results of the comparison. In one implementation, for example, processor 46 activates heating mechanism 17 when the data indicates a current temperature below the activation threshold and heating mechanism 17 is currently inactive. In another implementation, processor 46 may deactivate heating mechanism 17 if the data indicates a temperature above the deactivation threshold and heating mechanism 17 is currently activated. Alternatively, processor 46 may be programmed to activate and/or deactivate heating mechanism 17 in any manner that enables heating control system 41 to function as described herein.

In the example implementation, controller 44 may activate and/or deactivate heating mechanism 17 by controlling the flow of power via power line 50 to heating mechanism 17. Specifically, controller 44 may be electrically coupled to a switch (not shown) in power line 50 that may be used to selectively provide power to heating mechanism 17 from a power source. In other implementations, controller 44 controls an amount of power provided to heating mechanism 17, e.g., without limitation, using a variable current controlling device. In still other implementations, controller 44 transmits a signal to heating mechanism 17 instructing heating mechanism 17 to activate heating and/or deactivate heating.

Figure 4:
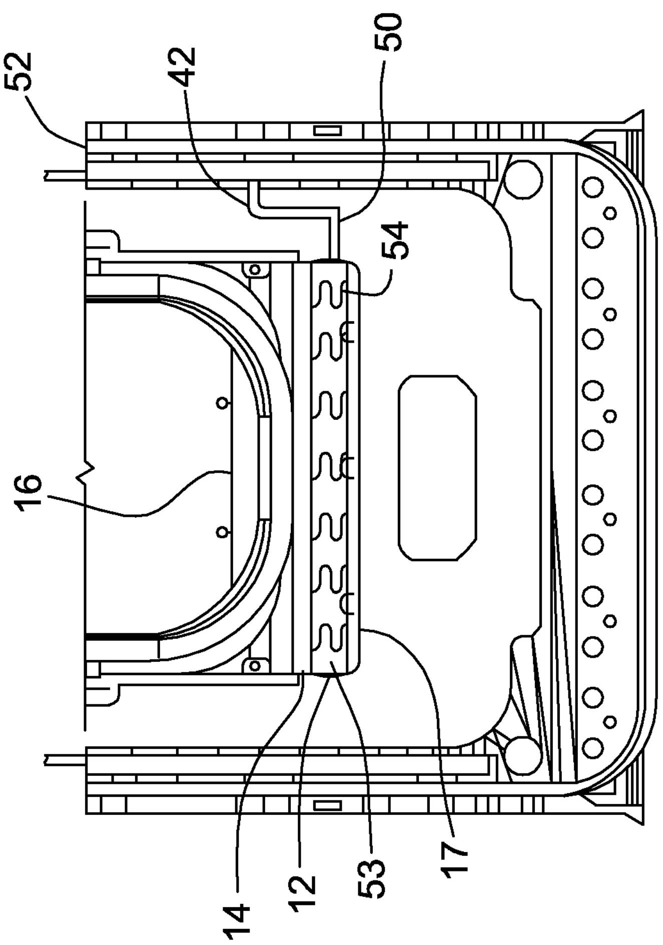
FIG. 4 is an inboard facing view of the over-wing exit system shown in FIG. 2 including a heated roller shade system having a resistive heating mechanism.

FIG. 4 is an inboard facing view of an over-wing exit door 19 (shown in FIG. 2) including heated roller shade system 10 (shown in FIG. 1) having a resistive heating mechanism 54. In the exemplary implementation, heating mechanism 17 is coupled to a power source 52, such as a conventional door heater or other power in the door, and includes a heating blanket 53 that includes at least one resistive heating mechanism 54. In the exemplary implementation, heating blanket 53 may be coupled to roller housing 14. Alternatively, heating blanket 53 may be positioned anywhere that enables heating blanket 53 to function as described herein. Resistive heating mechanism 54 is coupled to power source 52 via power line 50. Power line 50 transmits power to resistive heating mechanism 54 which, in turn, induces a current in resistive heating mechanism 54. Resistive heating mechanism 54 generates heat through resistive losses. Heat generated in resistive heating mechanism 54 radiates to heating blanket 53, which, in turn, radiates heat to roller 12, roller housing 14, and/or shade 16. In the exemplary implementation, resistive heating mechanism 54 may be coupled to power source 52 through a power line 50 that is configured to heat cabin wall 25 (shown in FIG. 2). In alternate implementations, resistive heating mechanism 54 may be coupled directly to one of roller 12, roller housing 14, and shade 16 without heating blanket 53.

Figure 5:
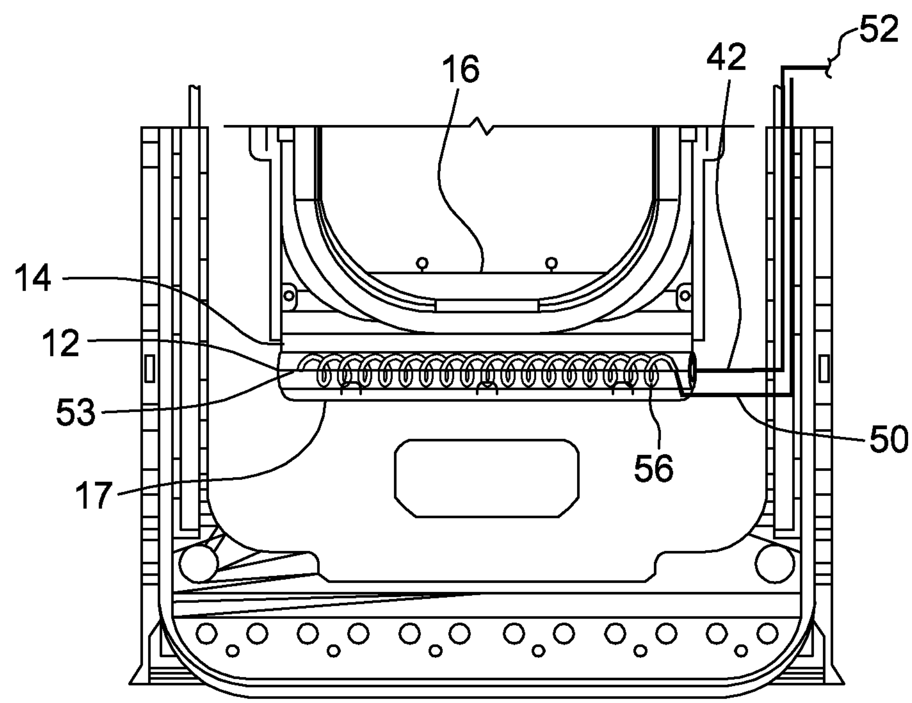
FIG. 5 is an inboard facing view of the over-wing exit system shown in FIG. 2 including a heated roller shade system having an inductive heating mechanism.

FIG. 5 is an inboard facing view of an over-wing exit door 19 (shown in FIG. 2) including heated roller shade system 10 (shown in FIG. 1) having at least one inductive heating mechanism 56. In one implementation, heated roller shade system 10 also includes a receiving element (not shown). In the exemplary implementation, inductive heating mechanism 56 is coupled to power source 52, such as a conventional door heater or other power in the door, through power line 50. In operation, power line 50 transmits power to inductive heating mechanism 56 which, in turn, induces a current in at least one receiving element. In at least one implementation, the receiving element may be roller 12 and/or roller housing 14. In another implementation, the receiving element may any device thermally coupled to at least one of roller 12, roller housing 14, or shade 16 that enables inductive heating mechanism 56 to operate as described herein. In the exemplary implementation, the induced current causes the receiving element to radiate heat from the receiving element to at least one of roller 12, roller housing 14, and shade 16 to facilitate increasing the temperature of heated roller shade system 10.

Figure 6:
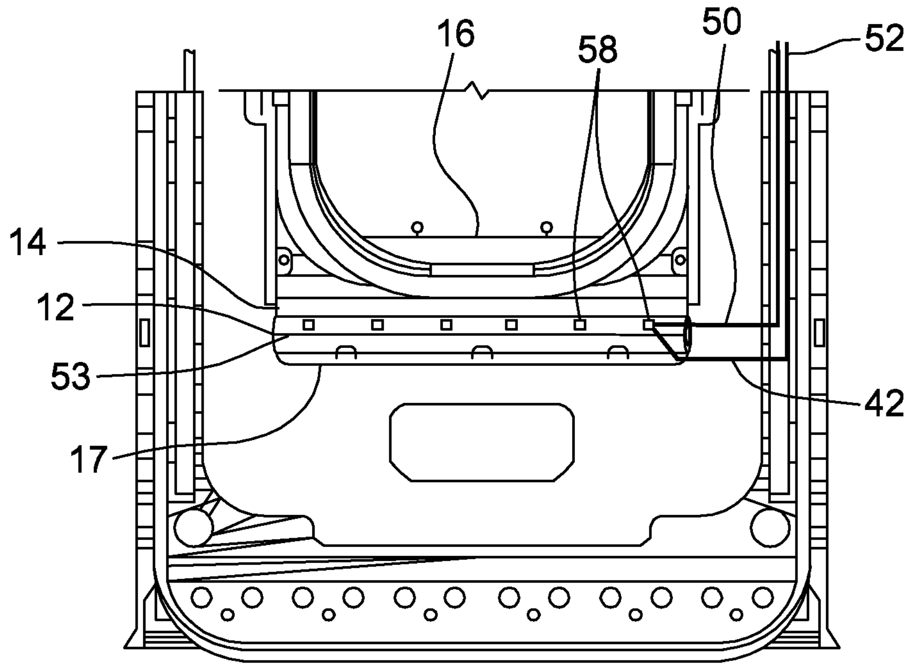
FIG. 6 is an inboard facing view of the over-wing exit system shown in FIG. 2 including a heated roller shade system having a thermo-electric heating mechanism.

FIG. 6 is an inboard facing view of an over-wing exit door 19 (shown in FIG. 2) including heated roller shade system 10 (shown in FIG. 1) having at least one thermo-electric heating mechanism 58. In the exemplary implementation, thermo-electric heating mechanism 58 is a thermo-electric ceramic. In other implementations, thermo-electric heating mechanism 58 may be any thermo-electric device that enables thermo-electric heating mechanism 58 to operate as described herein.

In one implementation, heated roller shade system 10 includes a heating blanket 53 that includes at least one thermo-electric heating mechanism 58. In the exemplary implementation, heating blanket 53 may be coupled to roller housing 14. Alternatively, heating blanket 53 may be positioned anywhere that enables heating blanket 53 to function as described herein. Also in the exemplary implementation, thermo-electric heating mechanism 58 is coupled to power source 52, such as a conventional door heater or other power in the door, through power line 50. Thermo-electric heating mechanism 58 has a cold-side (not shown) and a hot-side (not shown) based on the applied current from power line 50. In the exemplary implementation, thermo-electric heating mechanism 58 is oriented such that the hot-side of the thermo-electric heating mechanism 58 is proximate to heated roller shade system 10, and the cold-side of the thermo-electric heating mechanism 58 is distal from heated roller shade system 10. In operation, power line 50 provides power to the at least one thermo-electric heating mechanism causing the hot-side to radiate heat to heating blanket 53, which, in turn, radiates heat to at least one of roller 12, roller housing 14, and shade 16. In alternate implementations, thermo-electric heating mechanism 58 may be coupled directly to one of roller 12, roller housing 14, and shade 16 without heating blanket 53.

Figure 7:
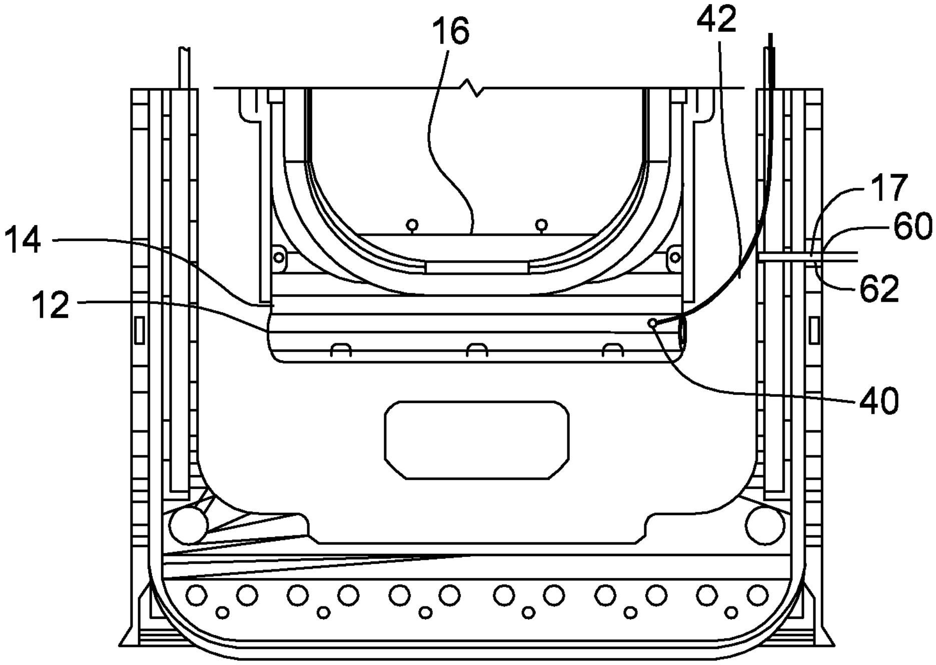
FIG. 7 is an inboard facing view of the over-wing exit system shown in FIG. 2 including a heated roller shade system having an air-gap-based heating mechanism.

FIG. 7 is an inboard facing view of an over-wing exit door 19 (shown in FIG. 2) including heated roller shade system 10 (shown in FIG. 1) having an air-gap-based heating mechanism. In such an implementation, heating mechanism 17 includes an air gap 60 and a valve 62. Air gap 60 extends from cavity 18 (shown in FIG. 2) through cabin wall 25 (shown in FIG. 2) to cabin 36 (shown in FIG. 2). As such, air gap 60 extends through the inner wall (e.g., cabin wall 25). In the exemplary implementation, when valve 62 is open, air flows from cavity 18 to cabin 36 and vice-versa through air gap 60. Further in the exemplary implementation, air within cabin 36 may be of a temperature higher than air within cavity 18, such that the transmission of air from cabin 36 to cavity 18 facilitates increasing the temperature of the air within cavity 18. The increased temperature of the air inside cavity 18 facilitates increasing the temperature in and around at least one of roller 12, roller housing 14, and shade 16.

In at least one implementation, air-gap-based heating mechanism 17 may be in communication with controller 44 (shown in FIG. 3), such that controller 44 controls the opening and closing of valve 62 based on the temperature data measured by temperature sensor 40 (shown in FIG. 3). Alternatively, valve 62 may be controlled in any manner that enables air-gap-based heating mechanism 17 to function as described herein.

Figure 8:
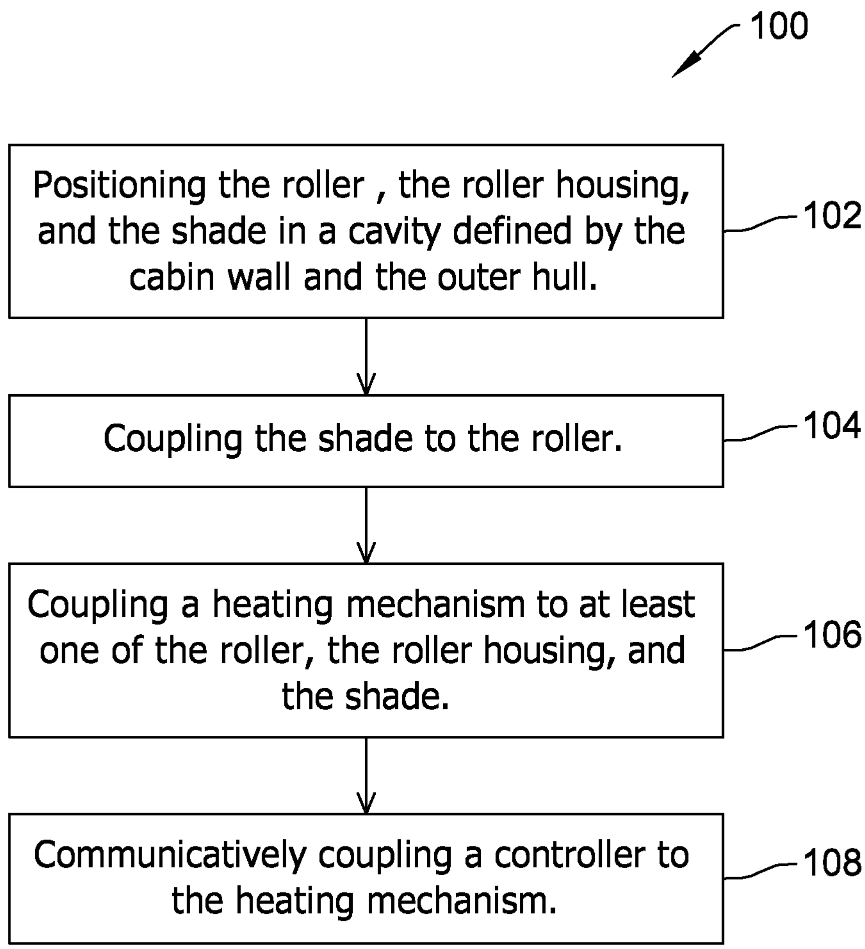
FIG. 8 is a flowchart of an exemplary method for assembling the heated roller shade system shown in FIG. 1.

FIG. 8 is an exemplary flowchart illustrating a method 100 for assembling a heated roller shade system 10. In the exemplary implementation, the method includes positioning 102 roller 12 (shown in FIG. 1) in a cavity 18 (shown in FIG. 2) defined by cabin wall 25 (shown in FIG. 2) and hull 20 (shown in FIG. 2). The method also includes coupling 104 shade 16 (shown in FIG. 1) to roller 12. Roller 12 is configured to selectively move shade 16 between fully deployed position 35 (shown in FIG. 2) and fully open position 34 (shown in FIG. 2). The method further includes coupling 106 heating mechanism 17 (shown in FIG. 1) to at least one of roller 12, roller housing 14 (shown in FIG. 1) and shade 16. Heating mechanism 17 facilitates increasing a temperature of at least one of roller 12, roller housing 14, and shade 16. In the exemplary implementation, coupling heating mechanism 17 to at least one of roller 12 and shade 16 includes thermally coupling at least one of a resistive heating mechanism 54 (shown in FIG. 4), an inductive heating mechanism 56 (shown in FIG. 5), a thermo-electric heating mechanism 58 (shown in FIG. 6), and an air-gap-based heating mechanism 17 having an air gap 60 (shown in FIG. 7) and a valve 62 (shown in FIG. 7) to at least one of roller 12, roller housing 14, and shade 16.

In the exemplary implementation, the method further comprises communicatively coupling 108 controller 44 to heating mechanism 17. Controller 44 controls activating and/or deactivating heating mechanism 17 based on an activation threshold and a deactivation threshold.

The above-described implementations disclose a durable and dependable heated roller shade system. The heated roller shade system uses a heating mechanism thermally coupled to at least one of the roller, the roller housing, and the shade to facilitate increasing the temperature of the roller shade system from a first temperature to a second temperature. In some implementations, the heated roller shade system described herein facilitates increasing the temperature in and around the roller shade system above a freezing temperature to facilitate preventing the buildup of ice in and around the roller shade system. The heated roller shade system thereby facilitates improving the dependability and durability of the roller and the shade. The heated roller shade system also contains controls to facilitate preventing overheating of the roller shade system. The heated roller shade system may also contain various heating mechanisms that may facilitate increasing the temperature in and around the roller and the shade, the various heating mechanisms having different power requirements, different weight aspects, and different overheating requirements.

A technical effect of the systems and methods described herein includes at least one of: (a) receiving data indicating at least one of a current temperature, a current humidity, and a time associated with the heated roller shade system from a sensor; (b) comparing the data with an activation threshold; (c) activating a heating mechanism based on the comparison between the data and the activation threshold to facilitate increasing a temperature of at least one of the roller and the shade; (d) comparing the data with a deactivation threshold; and (e) deactivating the heating mechanism based on the comparison between the data and the deactivation threshold.

Although specific features of various implementations of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heated roller shade system comprising:

a roller;

a shade coupled to said roller, wherein said roller is configured to selectively move said shade between a deployed position and an open position;

a roller housing, the roller housing substantially circumscribing the roller and shade and forming a gap along a longitudinal axis of the roller between the roller housing and any portion of the shade rolled on the roller, the roller housing located in a cavity defined between an inner wall of a vehicle and an outer wall of the vehicle, wherein said cavity is exposed to freezing temperature during at least a portion of operation of the vehicle; and a heating mechanism, coupled to an at least partially circumscribing portion of an outer surface of the roller housing, the heating mechanism for conductively heating the roller housing to non-conductively increase a temperature of the roller and shade above a freezing temperature to prevent ice buildup on the roller, the roller housing, the shade, and within said cavity.

2. The system in accordance with claim 1, further comprising:

a sensor; and a controller coupled to the heating mechanism and to the sensor, said controller configured to:

receive data indicating at least one of a current temperature, a current humidity, and a time associated with the roller housing from said sensor;

compare the data with an activation threshold;

activate the heating mechanism based on a comparison between the data and the activation threshold;

compare the data with a deactivation threshold; and deactivate the heating mechanism based on the comparison between the data and the deactivation threshold.

3. The system in accordance with claim 2, wherein said controller is further configured to:

compare the data to a deactivation threshold; and deactivate said heating mechanism based on the comparison between the data and the deactivation threshold.

4. The system in accordance with claim 1, wherein said heating mechanism includes at least one thermo-electric heating mechanism, wherein, when power is transmitted to said thermo-electric heating mechanism, a hot-side of said thermo-electric heating mechanism that is proximate to at least one of said roller and said shade facilitates increasing the temperature of at least one of said roller and said shade.

5. The system in accordance with claim 1, wherein said heating mechanism includes at least one resistive heating mechanism, wherein when power is transmitted to said at least one resistive heating mechanism, said at least one resistive heating mechanism facilitates increasing a temperature of at least one of said roller, said shade, and said roller housing.

6. The system in accordance with claim 1, wherein said heating mechanism includes at least one inductive heating mechanism, wherein when power is transmitted to said at least one inductive heating mechanism, said inductive heating mechanism induces a current in said roller housing.

7. The system in accordance with claim 1, wherein said heating mechanism is an air-gap-based heating mechanism including an air gap and a valve, wherein said air gap extends through the inner wall of the vehicle and said valve selectively controls the flow of air into the cavity through said air gap.

8. The system in accordance with claim 1, wherein said roller housing is insulated.

9. A system in accordance with claim 1, wherein said heating mechanism comprises one of a heating blanket including one of a resistive heating mechanism and a thermo-electric heating mechanism.

10. A method for assembling a roller shade system, said method comprising:

coupling a shade to a roller, wherein the roller is configured to selectively move the shade between a deployed position and an open position;

positioning a roller housing substantially circumscribing the roller and the shade and forming a gap along a longitudinal axis of the roller between the roller housing and any portion of the shade rolled on the roller, the roller housing disposed in a cavity defined by an inner wall of a vehicle and an outer wall of the vehicle, wherein the cavity is exposed to freezing temperature during at least a portion of operation of the vehicle wherein the roller housing substantially circumscribes the roller and the shade; and coupling a heating mechanism to an at least partially circumscribing portion of an outer surface of the roller housing, the heating mechanism for conductively heating the roller housing to non-conductively increase a temperature of the roller and shade above a freezing temperature to prevent ice buildup on the roller, the roller housing, the shade, and within the cavity.

11. The method in accordance with claim 10, further comprising coupling a controller to the heating mechanism, wherein the controller is configured to:

receive data indicating at least one of a current temperature, a current humidity, and a time associated with at the roller housing from a sensor;

compare the data with an activation threshold;

activate the heating mechanism based on a comparison between the data and the activation threshold;

compare the data with a deactivation threshold; and deactivate the heating mechanism based on the comparison between the data and the deactivation threshold.

12. The method in accordance with claim 10, wherein coupling a heating mechanism to the at least partially circumscribing portion of the roller housing includes coupling at least one of a thermo-electric heating mechanism, a resistive heating mechanism, an inductive heating mechanism, or an air-gap-based heating mechanism to the at least partially circumscribing portion of the roller housing.

13. The method in accordance with claim 10, wherein coupling a heating mechanism to the at least partially circumscribing portion of the roller housing includes coupling at least one of a thermo-electric heating mechanism and a resistive heating mechanism to the at least partially circumscribing portion of the roller housing; and the method further comprises:

positioning the at least one of the thermo-electric heating mechanism and the resistive heating mechanism within a heating blanket; and coupling the heating blanket to the at least partially circumscribing portion of the roller housing.

14. A door system for use in a vehicle, the door system comprising:

a door coupled to the vehicle;

a roller;

a shade coupled to said roller, wherein said roller is configured to selectively move said shade between a deployed position and an open position;

a roller housing, the roller housing substantially circumscribing the roller and shade and forming a gap along a longitudinal axis of the roller between the roller housing and any portion of the shade rolled on the roller, the roller housing located in a cavity defined between an inner wall of said door and an outer wall of said door, wherein said cavity is exposed to freezing temperature during at least a portion of operation of the vehicle; and a heating mechanism, coupled to an at least partially circumscribing portion of an outer surface of the roller housing, the heating mechanism for conductively heating the roller housing to non-conductively increase a temperature of the roller and shade above a freezing temperature to prevent ice buildup on the roller, the roller housing, the shade, and within said cavity.

15. The door system in accordance with claim 14, further comprising:

a sensor; and a controller coupled to the heating mechanism and to the sensor, said controller configured to:

receive data indicating at least one of a current temperature, a current humidity, and a time associated with at least one of said roller and said shade the roller housing from said sensor;

compare the data with an activation threshold; and activate the heating mechanism based on a comparison between the data and the activation threshold;

compare the data with a deactivation threshold; and deactivate the heating mechanism based on the comparison between the data and the deactivation threshold.

16. The door system in accordance with claim 14 further comprising a power source coupled to said door and to said heating mechanism, wherein said heating mechanism includes at least one thermo-electric heating mechanism, wherein, when power is transmitted to said thermo-electric heating mechanism from said power source, a hot-side of said thermo-electric heating mechanism that is proximate to at least one of the roller and the shade facilitates increasing the temperature of at least one of said roller and said shade.

17. The door system in accordance with claim 14 further comprising a power source coupled to said door and to said heating mechanism, wherein said heating mechanism includes at least one resistive heating mechanism, wherein, when power is transmitted to said at least one resistive heating mechanism from said power source, said at least one resistive heating mechanism facilitates increasing a temperature of at least one of the roller, the shade, and the roller housing.

18. The door system in accordance with claim 14 further comprising a power source coupled to said door and to said heating mechanism, wherein said heating mechanism includes at least one inductive heating mechanism, wherein, when power is transmitted to said at least one inductive heating mechanism from said power source, said inductive heating mechanism induces a current in said roller housing.

19. The door system in accordance with claim 14, wherein said heating mechanism is an air-gap-based heating mechanism that includes an air gap and a valve, wherein said air gap extends through the inner wall of the door and said valve selectively controls the flow of air into the cavity through said air gap.

* * * * *